United States Patent [19]

Clair

[11] Patent Number: 5,382,413
[45] Date of Patent: Jan. 17, 1995

[54] SAFETY MODULE FOR HYDROGEN GENERATING REACTORS

[75] Inventor: René Clair, Martigues, France

[73] Assignee: Elf Atochem S.A., Puteaux, France

[21] Appl. No.: 6,522

[22] Filed: Jan. 21, 1993

[30] Foreign Application Priority Data

Jan. 21, 1992 [FR] France ............... 92/00604

[51] Int. Cl.⁶ .............. B01D 50/00; G05B 9/00; C22B 3/02
[52] U.S. Cl. .................... 422/168; 422/117; 266/101; 266/147; 266/157
[58] Field of Search ............... 422/111, 117, 168, 280, 422/169; 266/101, 144, 147, 157; 241/31

[56] References Cited

U.S. PATENT DOCUMENTS

| | | | |
|---|---|---|---|
| 3,529,931 | 9/1970 | Moklebust | 423/481 |
| 3,626,672 | 12/1971 | Burbidge | 266/147 X |
| 3,856,918 | 12/1974 | Skrivan et al. | 423/69 |
| 3,894,853 | 7/1975 | Pike | 266/157 X |
| 4,244,529 | 1/1981 | DeGabrele et al. | 241/31 X |
| 4,272,343 | 6/1981 | Brunsell et al. | 204/130 |
| 5,182,078 | 1/1993 | Baldi | 414/9 |

FOREIGN PATENT DOCUMENTS 918659 2/1947 France.
2256767 1/1974 Germany.

Primary Examiner—Robert J. Warden
Assistant Examiner—E. Leigh Dawson
Attorney, Agent, or Firm—Burns, Doane, Swecker & Mathis

[57] ABSTRACT

A reactor provided with a gas-safety device/module therefor comprises (i) a reaction vessel having an open upper end, (ii) demisting means engaging and at least partially closing off the open upper end of such reaction vessel, and situated to traverse the path of direction of a gas stream, e.g., hydrogen, evolving from a reaction conducted within such reaction vessel, and (iii) inlet means intermediate such open upper end of the reaction vessel and the demisting means (ii) for charging a stream of air into the reaction vessel, such inlet means (iii) being adopted to charge an amount of air into the reaction vessel such as to maintain the composition of any air/evolved gas mixture below the ignition/explosive limits thereof.

5 Claims, 1 Drawing Sheet

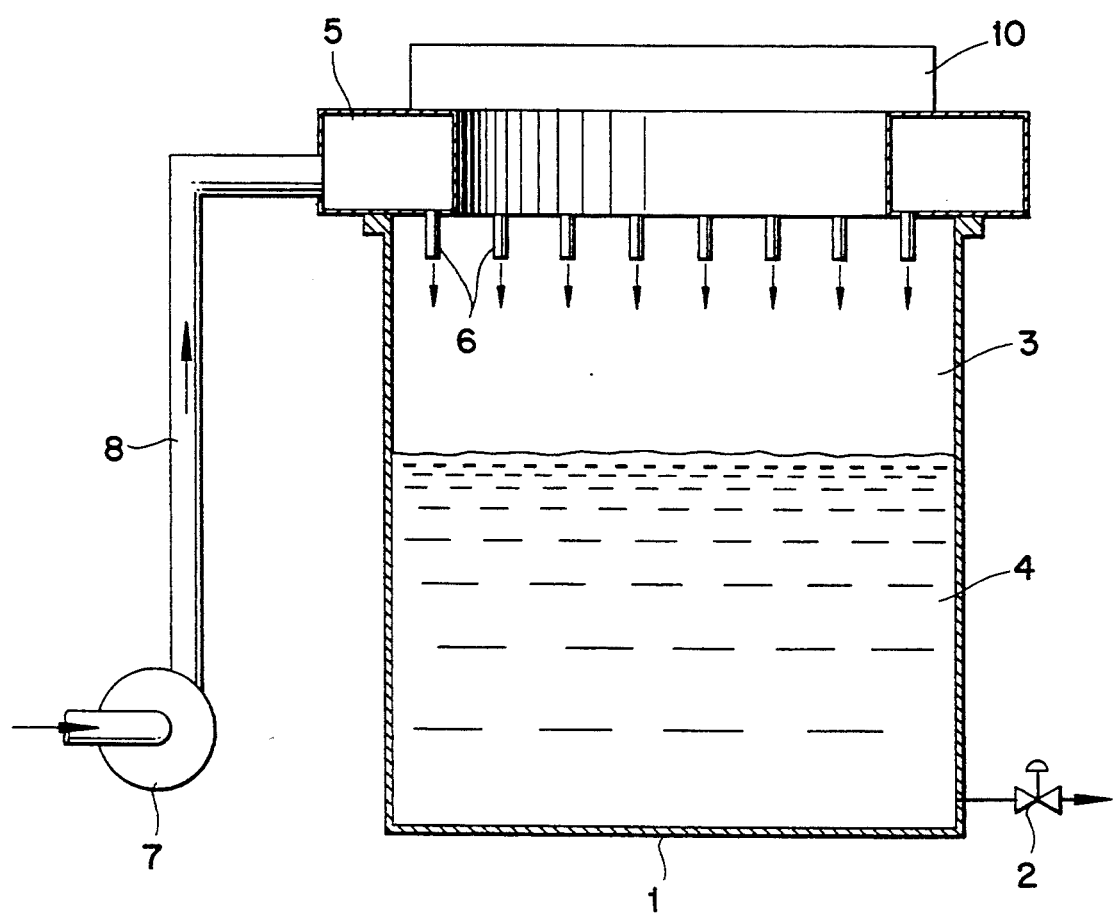

SAFETY MODULE FOR HYDROGEN GENERATING REACTORS

BACKGROUND OF THE INVENTION

1. Field of the Invention

The present invention relates to a device or module for reducing the entrainment of vesicles or "encapsulated" products/byproducts of reaction in a stream of hydrogen gas.

2. Description of the Prior Art

Reactors which are open at their open upper end and digesters wherein an acid is reacted with a metal or an oxide to form a salt with concomitant evolution of hydrogen are not uncommon to this art. These vessels are placed outdoors such that the hydrogen produced can easily be released without forming flammable or explosive mixtures. However, as the reaction is exothermic, the acidic solution containing the salt is hot, and the vapor pressure is high, the evolution of hydrogen within this reaction solution results in an effervescence which effects entrainment of certain vesicles therein. For example, when ferrous chloride is prepared by digesting iron turnings in a hydrochloric acid solution, the resulting stream of hydrogen gas entrains vesicles of an aqueous solution of hydrochloric acid and ferrous chloride. This causes pollution and strong corrosion due to the presence of hydrochloric acid. On the other hand, since there is no confinement, the risks of the possible explosion of the air/hydrogen mixture are negligible and are limited to transient ignitions.

SUMMARY OF THE INVENTION

Accordingly, a major object of the present invention is the provision of means for reducing the entrainment of vesicles of reaction in a by-product stream of hydrogen gas while avoiding the creation of explosive mixtures.

Another object of this invention is the provision of such means that also permit easy access to the surface of the vessel or reactor in order to introduce a metal or oxide reactant therein.

Briefly, the present invention features a device/module for reducing the entrainment of vesicles of reaction in a hydrogen stream emanating from an open reaction vessel, comprising:

(a) demisting means traversing/interrupting the hydrogen gas stream and arranged to completely or partially close off the opening of the reaction vessel, (b) means for introducing air into the vessel and arranged or situated intermediate the opening of the reaction vessel and the demisting means (a), such means (b) being adopted to ensure that an amount of air is introduced that maintains the air/hydrogen mixture always below the lower limit of the explosive/ignition range.

BRIEF DESCRIPTION OF THE DRAWING

The Figure of Drawing is a diagrammatic/schematic representation of a reaction vessel equipped with one embodiment of a safety module according to the present invention.

DETAILED DESCRIPTION OF PREFERRED EMBODIMENTS OF THE INVENTION

More particularly according to the present invention, the demisting means are advantageously (i) a system of baffles, (ii) a screen mat commonly designated "demister screen" and which is often placed atop scrubbing columns above the last plate or the last packing layer such that vesicles are not entrained in any gases emanating therefrom, or (iii) any equivalent means.

This demisting means can be arranged or situated in any manner, the simplest being to place it above the opening of the vessel as a lid. All or a portion of the opening of the vessel can thus be closed off; advantageously the opening is completely closed off.

The means for introducing air can be a conduit in the configuration of a distribution ring arranged on the upper rim of the reaction vessel. It is supplied by an inlet pipe originating from a fan, and the ring is apertured with holes extending inside of the vessel to permit injecting air into the gas phase established in the upper end of the vessel. The demisting means can be placed onto this ring. Advantageously, the demisting means is simply placed on the ring, itself fixed to the rim of the reaction vessel. The means can be in several parts; thus, one of the parts can be easily removed with a load suspension means in order to permit charging of the vessel, for example, with metal or metal oxides. The same load suspension means can be used for the demisting means and for charging the metal or oxides.

The advantage of the demisting means when it is simply placed on the ring is that it can easily be lifted/removed in the event of ignition or explosion of the air/hydrogen mixture, thus avoiding discharge of material when pressurized tanks explode.

The amount of air to be introduced into the vessel such that the composition of the air/hydrogen mixture is always below the lower limit of the ignition range is determined according to the conventional ignitability and explosability diagrams. For example, if the gas phase of the vessel contains air, hydrogen and water vapor, the temperature is 42° C. and the total pressure 100 hPa, then the amount of hydrogen must be less than 4% by volume (as long as the amount of water vapor is less than 60%). Compare, for example, Ullmans' *Encyclopedia Of Chemical Technology*, 5th edition, Volume A13, pages 308 and 309.

The Figure of Drawing represents one embodiment of the device/module of the invention, wherein 1 represents the reaction vessel, 2 a valve for emptying the vessel, 3 the gas phase within the vessel which receives the hydrogen generated in the liquid phase 4. Numeral 5 represents the air distribution ring which is toric in shape, having a rectangular cross section, and the several elements 6 are the air distribution nozzles. numerals 7 and 8 respectively represent the fan and the inlet tube for delivering air to the ring 5; 10 is the demisting means.

Advantageously, the demisting means (10) can be cleaned while in operation using a jet of water or spray manifolds. It is also within the scope of the invention for the jet of water to include a jet supplied with the acid which is used to supply the vessel, and likewise for the sprayers.

It has now been determined that fouling of the demister can be greatly reduced by charging with moisture the air which is introduced to dilute the hydrogen.

The air can be charged with moisture by spraying water therein; advantageously the air is saturated with moisture. To ensure saturating the air with moisture, an excess amount of water is introduced. It may be necessary to collect such excess in the lower regions of the means for injecting air, to avoid diluting the solution in the vessel.

The device/module of the invention is particularly useful in association with a vessel for digesting iron via a hydrochloric acid solution, in a process for the synthesis of ferrous chloride. The present invention also features application of this device/module for reducing the entrainment of vesicles of $FeCl_2/H_2O/HCl$ in such preparation of $FeCl_2$.

While the invention has been described in terms of various preferred embodiments, the skilled artisan will appreciate that various modifications, substitutions, omissions, and changes may be made without departing from the spirit thereof. Accordingly; it is intended that the scope of the present invention be limited solely by the scope of the following claims, including equivalents thereof.

What is claimed is:

1. A reactor for the reaction of a substance from which there evolves a gas stream having vesicles of reaction entrained therein, said reactor comprising:
   a reaction vessel containing as reactants, a metal or an oxide and an acid, to form a salt and evolve hydrogen, and including an upper outlet for discharging gas evolved from the reaction;
   a demister disposed adjacent said outlet and extending across a travel path of gas evolving from the reaction for conducting the gas through the demister while removing vesicles therefrom; and
   an air-introducing conduit connected to a source of air and arranged to introduce air into the reaction vessel at a location below said demister to mix with the gas upstream of said demister, for maintaining the air/gas mixture below the explosive limits thereof.

2. A reactor according to claim 1, wherein said air-introducing conduit comprises a ring-shaped pipe mounted atop said reaction vessel and configured for permitting the gas to flow through said ring-shaped pipe, said demister being disposed atop said ring-shaped pipe.

3. A reactor according to claim 2, wherein said demister defines an uppermost end of said reactor to be lifted-off in the event of an explosion in said vessel.

4. A reactor according to claim 1, wherein said demister defines an uppermost end of said reactor to be lifted-off in the event of an explosion in said vessel.

5. A reactor according to claim 1 including means for introducing water into the air in said air introducing conduit.

* * * * *